July 30, 1968  G. F. MEYER  3,395,308
MEANS FOR MOUNTING A REEL ASSEMBLY FOR CONTINUOUS WELDING
Filed Oct. 11, 1965  2 Sheets-Sheet 1
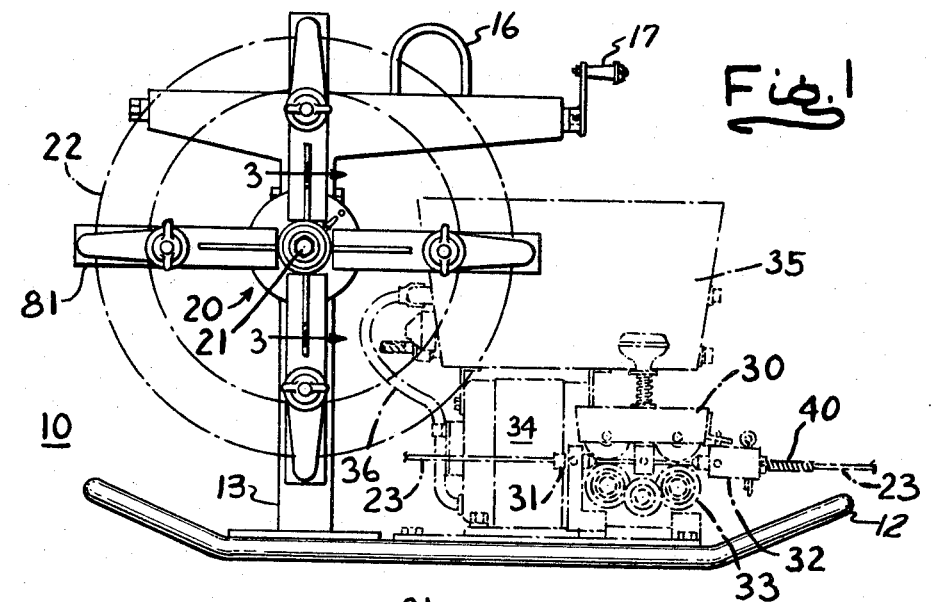
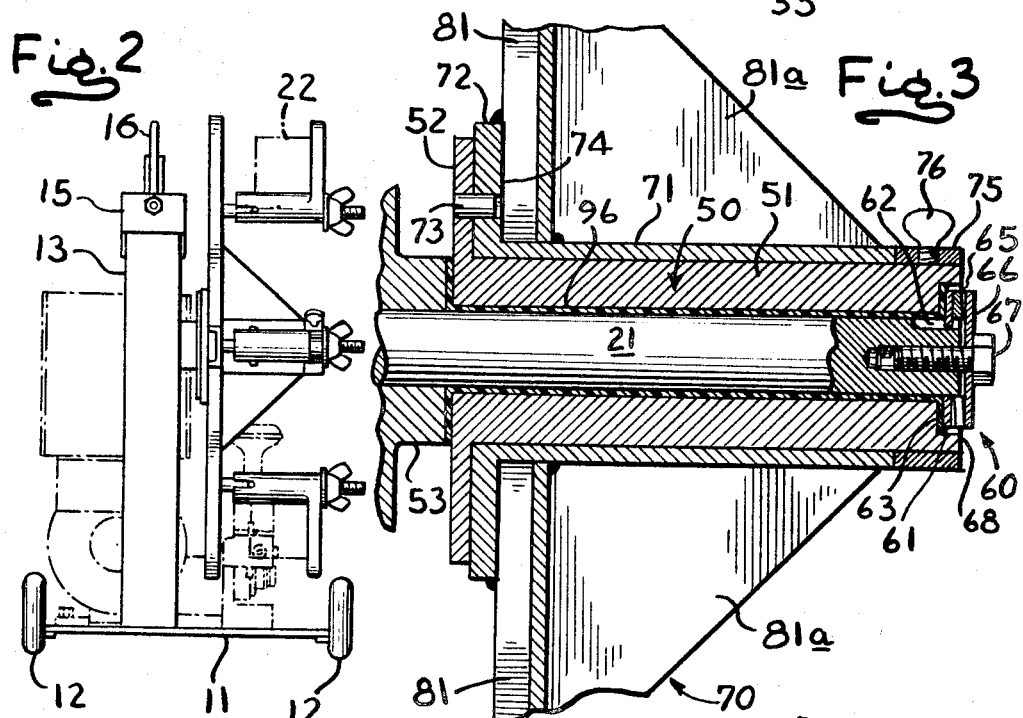
INVENTOR
GILBERT F. MEYER
PENDLETON, NEUMAN,
SEIBOLD & WILLIAMS
ATTY.

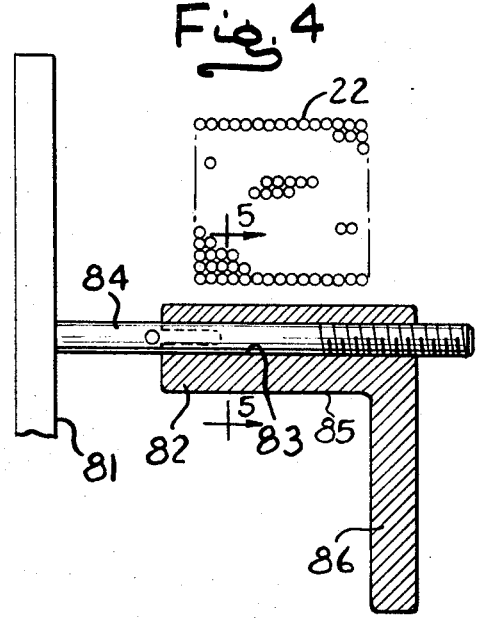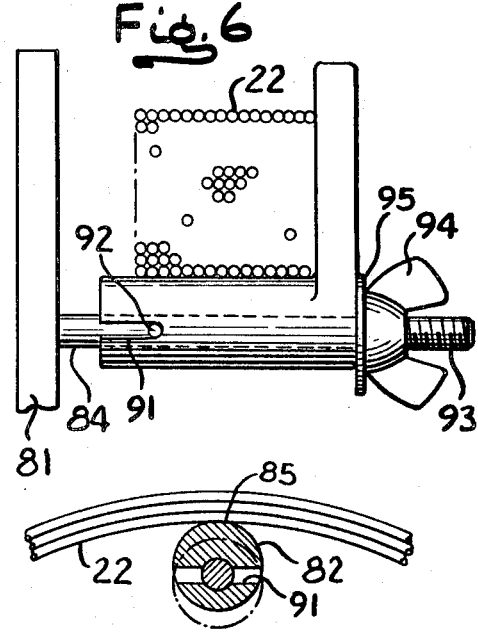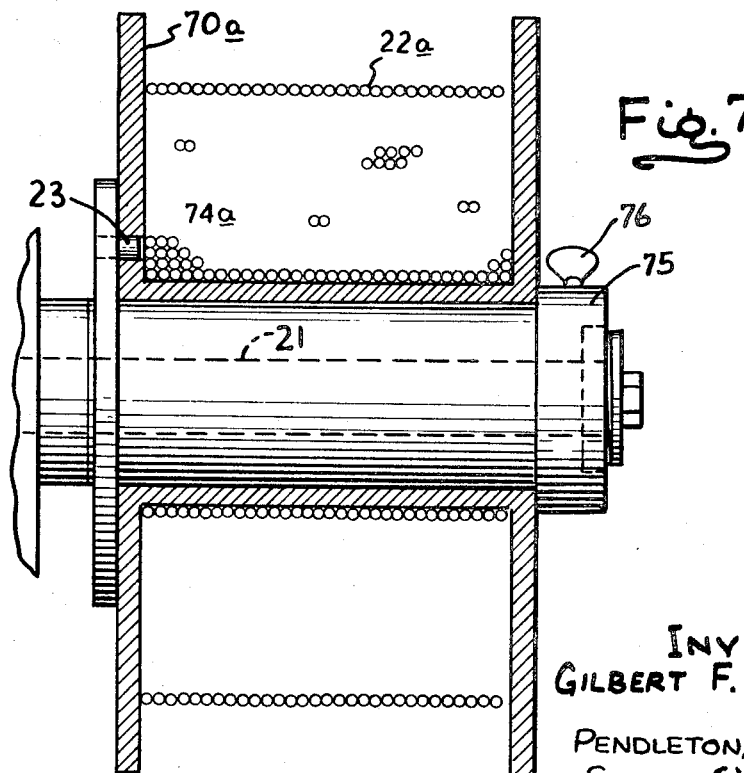

United States Patent Office 3,395,308
Patented July 30, 1968

3,395,308
MEANS FOR MOUNTING A REEL ASSEMBLY FOR CONTINUOUS WELDING
Gilbert F. Meyer, Milwaukee, Wis., assignor to Machinery and Welder Corporation, Skokie, Ill., a corporation of Missouri
Filed Oct. 11, 1965, Ser. No. 494,487
8 Claims. (Cl. 314—68)

The present invention relates to electric welding and more particularly to an improvement in the means for furnishing welding wire in a continuous length to the welding torch.

It is an object of the present invention to provide a novel reel assembly for the supplying of wire in a continuous length. More specifically, it is an object to provide a reel assembly capable of accepting wire both in the form of wire prewound on a relatively small diameter spool and wire supplied in the form of a coil having relatively large diameter and in which certain of the novel features and advantages are available and effective regardless of the form in which the wire is supplied to the equipment user.

It is an object of the invention in one of its aspects to provide a novel wire reel assembly having a brake in the hub and in which means are provided for insuring that a coil of wire is firmly clamped into position on the spool with no possibility of slippage to defeat the braking action.

It is another object of the invention to provide a reel assembly for furnishing a continuous length of welding wire having a number of features and advantages but which is nonetheless of elegant simplicity, easily operated including the loading and unloading of the wire, and inherently inexpensive to construct and maintain.

Other objects and advantages of the invention will become apparent upon reading the attached detailed description and upon reference to the drawings in which:

FIGURE 1 is a side elevation of welding apparatus constructed in accordance with the invention;

FIG. 2 is a left hand end view of the apparatus shown in FIG. 1;

FIG. 3 is a fragmentary axial section taken along the line 3—3 in FIG. 1;

FIG. 4 is a fragmentary view of one of the eccentric elements forming the mandrel assembly showing the coil of wire being slid into position;

FIG. 5 is a fragmentary cross section taken through one of the eccentric elements looking along the line 5—5 in FIG. 4 and with the element rotated into its clamping position.

FIG. 6 shows the eccentric element locked in place;

FIG. 7 shows the alternate use of a small diameter spool of wire on the same hub assembly.

While the invention has been described in connection with certain preferred embodiments, it will be understood that I do not intend to be limited to the embodiments discussed herein but intend to cover the various alternative and equivalent constructions included within the spirit and scope of the appended claims.

Turning now to the drawings there is disclosed an electric welding assembly 10 having a frame which includes a base plate 11 and skids 12. Integral with the base plate is an upstanding supporting member or pedestal 13. The latter mounts a movable eye assembly 15 including an eye 16 which may be adjusted in longitudinal position by a crank 17 as discussed in some detail in my copending application Ser. No. 494,486, filed Oct. 11, 1965. For the purpose of supplying welding wire to the driving elements, a novel reel assembly 20 is provided including a central horizontal spindle 21 rigidly mounted on the pedestal 13. The coil of wire, indicated at 22, has a lead portion 23.

Prior to describing the details of the reel assembly, it may be noted that the apparatus includes a wire drive unit 30 having an inlet 31 and an outlet 32 with a set of interposed wire drive rollers 33. The rollers are driven by a drive motor 34 via suitable step-down gearing (not shown). The speed of the motor is maintained constant by speed control circuitry, also not shown, which is included in a control unit 35 connected to the motor by a cable 36. At the outlet 32 of the drive unit is connected a semi-flexible cable 40 through which passes the welding wire 23. The welding torch (not shown) which is connected to the opposite end of the conduit 40 is manually held for directing the welding wire to the working area. For a disclosure of a typical torch which may be employed with the present invention reference is made to my copending application Ser. No. 325,079, filed Nov. 20, 1963.

In carrying out the invention, a hub is provided, rotatable on the spindle, mounting a spool of welding wire and having means for applying a constant, but adjustable, braking torque, together with means for insuring that no slippage occurs between the coil of wire and the hub so that the brake is at all times effective. Turning to FIG. 3 the hub generally indicated at 50 includes a hollow cylindrical portion 51 which is telescoped over the spindle and a base or flange portion 52 which is bottomed with respect to an annular land 53 on the pedestal. For the purpose of applying braking torque, a brake 60 is provided which includes a stationary washer 61 which is keyed in a slot 62 formed in the end of the spindle and which is adjacent an end face 63 on the hub. For causing the stationary washer to frictionally engage the hub, a spring washer 65 is used to which pressure is applied by a pressure disk 66 which is held at the end of the spindle by an adjustable bolt 67. Conveniently, all or a portion of the braking elements may be enclosed within an annular recess 68 at the end of the hub. It will be apparent that by tightening the bolt 67 the pressure disk 66 presses against the spring washer which in turn resiliently engages the stationary washer to provide the necessary frictional drag on the end face of the hub.

In accordance with one of the aspects of the present invention, a spool carrying the welding wire is telescoped over the hub and keyed directly to it. In the preferred embodiment the spool, indicated at 70 has a cylindrical sleeve 71 which is dimensioned to telescope over the hub and having a flange 72 which seats directly on the flange of the hub. For locking the two members together a key is provided in the form of a pin 73 anchored in the hub flange and which registers with an opening 74 in the flange of the spool. To maintain the spool captive on the hub, a retaining collar 75 is used having a wing screw 76. It will be apparent to one skilled in the art that the key 73 is engaged simply by sliding the spool into its seated position and, until the key is engaged, it is not possible to mount the retaining collar. Together the key and collar cause the spool and hub to rotate as one.

In accordance with one of the further aspects of the invention, the spool 70 is in the form of a spider having a plurality of radially extending legs each of which mounts an eccentric coil supporting element, or clamping member, and with the eccentric elements, taken together, forming an expanding mandrel for engaging the inside surface of the coil of wire to physically support the coil and to preclude any possibility of slippage with respect to the spool.

Thus, referring to FIGS. 4–6, a typical leg 81 on the spider has an eccentric element 82, with a longitudinal but eccentrically positioned bore 83 which is telescoped over a post 84 on the spider leg. The eccentricity of the opening 83 defines a "high" surface 85. Radially alined with the high surface is a radial projection 86 which acts as a retainer to retain the convolutions of the wire coil as well as a handle for rotating the eccentric.

For loading a coil of wire onto the reel assembly, the eccentric elements are pulled outwardly and the handles 86 thereon are turned inward. This presents the "low" side to the coil as shown in FIG. 4. Following this, the handles 86 are rotated so that they extend radially outward accompanied by 180° rotation of the eccentrics and bringing the "high" side of each of them into engagement with the wire coil as shown in FIG. 5. Since the eccentricity in a practical case may be made quite shallow, the operator has the benefit of a high mechanical advantage so that substantial clamping pressures may be achieved accompanied by slight deformation of the coil out of its circular configuration or by slight bending of the posts 84. The legs 81 are preferably reinforced by triangular braces 81a.

For the purpose of insuring that the eccentric elements remain in their clamping position, each of the elements is provided with a slot, indicated at 91 which registers with a pin 92 transversely arranged near the base of the associated post 84. In order to move the eccentric element 82 inwardly notwithstanding the clamping pressure, the ends of the posts 84 are preferably threaded as indicated at 93 for screwing on of a wing nut 94 having an associated washer 95. Turning the wing nuts 94 in sequence, the eccentric elements are crowded inwardly into the locked position shown in FIG. 6. After the eccentrics are seated, it is not an easy matter to retract them, thus discouraging theft of the coil of wire mounted on the welding apparatus. By the time that the coil is consumed, the clamping force no longer exists and the structure may be easily disassembled for restoration to the condition shown in FIG. 4 for loading on of a fresh coil.

The arrangement has been found to be ideally suited for the mounting of coils of wire having a standard 12" internal diameter and three to four inches in width weighing on the order of 60 pounds. For using bare coils of different diameters, sockets may be provided in the legs of the spider for receiving the posts 84 in a different circular locus. The hub structure is, moreover, well adapted for employing, on the same hub structure, pre-wound spools of welding wire having a standard central opening which may be telescoped directly over the hub in lieu of the spool 70 described above but utilizing the same keying means and the same retaining collar. Thus, as shown in FIG. 7, a typical spool indicated at 70a, carrying a coil 22a, has a sidewall with a pin receiving opening 74a registering with the pin 73. The spool is retained in this keyed position by means of the retaining collar 75 by turning tight the wing screw 76. The braking torque is fully effective in either case, but since the pre-wound spool will normally have a lesser degree of inertia than the spool 70 and its coil 22, the braking torque may be reduced, if desired, by slightly unscrewing the bolt 67 pressing against the pressure disk.

Since the welding wire is subjected to the welding voltage by electrode shoes within the torch, the entire coil is electrically "hot." For the purpose of electrically isolating the coil from the frame therefor, an insulating barrier is provided which is preferably in the form of an insulating sleeve 96 interposed between the hub and the spindle and which serves the purpose of a wear-resistant bearing. Nylon may, for example, be used for the purpose. Alternatively, the barrier may be employed elsewhere in the grounding path between the wire and the frame of the apparatus, or, if desired, the hub itself may be formed of some durable plastic material.

In spite of the number of features and advantages which are inherent in the construction described above, the construction is simple, economical and long-lived, and permits the loading of a new coil of wire in a few minutes' time, permitting the apparatus to be maintained in use constantly through the entire work shift.

I claim as my invention:

1. In an electric welding assembly for use with a torch having a conduit for feeding a bare welding wire to the work in a continuous length, the combination comprising a frame having a vertical support member integral therewith, a spindle extending horizontally from the support member, a hub rotatably mounted on the spindle, said hub having a flange portion facing the supporting member and a hollow cylindrical portion telescoped over the spindle, means including a spring member at the end of the spindle for applying frictional braking torque to the spindle, a spool of wire on the cylindrical portion of the hub and seating against the flange portion thereof, a key for rotatably coupling the flange and spool engageable as the spool is slipped endwise into its seated position on the hub, a retaining member for holding the outer end of the spool captive on the hub, means for forward driving of the wire pulled from the spool against the braking torque for feeding of the wire to the torch, and means including an insulating barrier for preventing contact between the wire and the frame and interposed in the conductive path therebetween.

2. In an electric welding assembly for use with a torch having a conduit for feeding a bare welding wire to the work in a continuous length, the combination comprising a frame having a vertical support member integral therewith, a spindle extending horizontally from the support member, a hub rotatably mounted on the spindle, said hub having a flange portion facing the support member and a hollow cylindrical portion telescoped over the spindle, a stationary washer slidably keyed to the outer end of the spindle and lying adjacent to the outer end of the hub, a spring washer adjacent the stationary washer, adjustable means at the end of the spindle for applying force endwise to the spring washer for application of braking torque to the hub, a spool of wire on the cylindrical portion of the hub and seated against the flange portion, a key for rotatably coupling the flange and spool engageable as the spool is slipped endwise into seated position on the hub, a retaining member for holding the outer end of the spool captive on the hub, means for pulling the wire from the spool against the braking torque, and means including an insulating barrier for preventing contact between the wire and the frame interposed in the conductive path therebetween.

3. In an electric welding assembly for use with a torch having a conduit for feeding a bare welding wire to the work in a continuous length, the combination comprising a frame having a vertical support member integral therewith, a spindle extending horizontally from the support member, a hub rotatably mounted on the spindle, said hub having a flange portion facing the support member and a hollow cylindrical portion telescoped over the spindle, means for rotating the hub and for applying braking torque thereto, a spool of wire on the cylindrical portion of the hub seating against the flange portion, a key for rotatably coupling the flange and spool engageable as the spool is slipped endwise into its seated position, a retaining member for holding the spool captive on the hub, means for pulling the wire from the spool and feeding it on the torch notwithstanding the braking and frictional forces to which the wire is subjected, and an insulating sleeve interposed between the hub and the spindle to insure electrical isolation of the wire with respect to the frame of the assembly.

4. In an electric welding assembly for use with a torch having a conduit for feeding a bare welding wire to the work in a continuous length, the combination comprising a frame having a vertical support member integral therewith, a spindle extending horizontally from the support member, a hub rotatably mounted on the spindle, said hub having a flange portion for facing the support member and a hollow cylindrical portion telescoped over the spindle, means interposed between the hub and the spindle for applying braking torque to the latter, a spool on the cylindrical portion of the hub and seating against the flange portion, a key for rotatably coupling the flange and spool engageable as the spool is slipped endwise into its seated position, said spool having a plurality of eccentric clamping members spaced at equal radii and arranged parallel to the spool axis for engaging the inner surface of a coil of welding wire, said clamping members each having means for rotating the same to bring the high region of the eccentric into clamping engagement with the inside of the coil of wire thereby to secure the coil with respect to the spool, means for pulling the wire from the coil against the braking torque for feeding the same to the torch at a constant feed rate, and means including an insulating barrier for electrically isolating the wire with respect to the frame, and interposed in the conductive path therebetween.

5. In an electric welding assembly for use with a torch having a conduit for feeding a bare welding wire to the work in a continuous length, the combination comprising a frame having a vertical support member integral therewith, a spindle extending horizontally from the frame, a hub on the spindle, means for applying frictional braking torque to the hub, a spool on the hub, a key for rotatably coupling the hub and the spool when the spool is seated in position on the hub, means defining an expanding mandrel for telescoped reception of a coil of welding wire, means for expanding the mandrel outwardly into a tight seated contact with the inner edge of the coil, means on the frame for pulling the wire from the core against the braking torque and for feeding at a controlled rate to the torch, and means including an insulating barrier for electrically isolating the wire with respect to the frame and interposed in the conductive path therebetween.

6. In an electric welding assembly for use with a torch having a conduit for feeding a bare welding wire to the work in a continuous length, the combination comprising a frame having a vertical support member integral therewith, a spindle extending horizontally from the support member, a hub mounted on the spindle, means for applying brake torque to the hub, a spool telescoped over the hub and having means for holding the spool fixed and captive thereon, a plurality of wire clamping members on the spool, said wire clamping members being spaced at equal radii, said clamping members each being in the form of an eccentric parallel to the spool axis and having a retaining arm at its outer end so that when a coil of wire is slipped into place thereon and the retaining arms are rotated into coil-retaining position the high regions of the eccentrics are presented to the inside surface of the coil of wire thus clamping the coil firmly with respect to the spool, means for holding the clamping members in their clamping positions, and means including an insulating barrier for electrically isolating the wire from the frame and interposed in the conductive path therebetween.

7. In an electric welding assembly for use with a torch having a conduit for feeding a bare welding wire to the work in a continuous length, the combination comprising a frame having a vertical support member integral therewith, a spindle extending horizontally from the support member, a hub mounted on the spindle, means for applying braking torque to the hub, a spool telescoped over the hub and having means for holding the spool fixed and captive thereon, a plurality of posts on the spool spaced at equal radii and parallel to the spool axis clamping members in the form of eccentric cylinders telescoped over the posts and having a retaining arm at its outer end so that when a coil of wire is slipped into place thereon and the retaining arms are rotated into coil-retaining position the high regions of the eccentrics are presented to the inside surface of the coil of wire thus clamping the coil firmly with respect to the spool, a pin and slot connection between the posts and the clamping members in register when the clamping members are in clamping position and engageable by applying pressure inwardly to the clamping members, and means including an insulating barrier for electrically isolating the wire from the frame and interposed in the conductive path therebetween.

8. In an electric welding assembly for use with a torch having a conduit for feeding a bare welding wire to the work in a continuous length, the combination comprising a frame having a vertical support member integral therewith, a spindle extending horizontally from the support member, a hub rotatably mounted on the spindle, said hub having a flange portion facing the supporting member and a hollow cylindrical portion telescoped over the spindle, means including a spring member at the end of the spindle for applying frictional braking torque to the spindle, a spool of wire on the cylindrical portion of the hub and seating against the flange portion thereof, a key for rotatably coupling the flange and spool engageable as the spool is slipped endwise into its seated position on the hub, a retaining member for holding the outer end of the spool captive on the hub, said hub having a length greater than the axial length of the spool to project beyond the latter and said retaining member having means for disengageably clamping the same to the projecting end of the hub to facilitate removal of the spool for substitution of a different spool having the same inside diameter and keying provision, means for forward driving of the wire pulled from the spool against the braking torque for feeding of the wire to the torch, and means including an insulating barrier for preventing contact between the wire and the frame and interposed in the conductive path therebetween.

References Cited
UNITED STATES PATENTS 2,783,952   3/1957   Clay   242—84.21
2,990,135   6/1961   Croteau et al.   242—129
3,309,497   3/1967   Kensrue   219—130

BERNARD A. GILHEANY, *Primary Examiner.*

R. N. ENVALL, JR., *Assistant Examiner.*

UNITED STATES PATENT OFFICE
CERTIFICATE OF CORRECTION

Patent No. 3,395,308 July 30, 1968

Gilbert F. Meyer

It is certified that error appears in the above identified patent and that said Letters Patent are hereby corrected as shown below:

Column 4, line 30, "spinde" should read -- spindle --; line 40, the period should read a comma; line 51, "rotating" should read -- retaining --.

Signed and sealed this 13th day of January 1970.

(SEAL)
Attest:

Edward M. Fletcher, Jr.
Attesting Officer

WILLIAM E. SCHUYLER, JR.
Commissioner of Patents